UNITED STATES PATENT OFFICE.

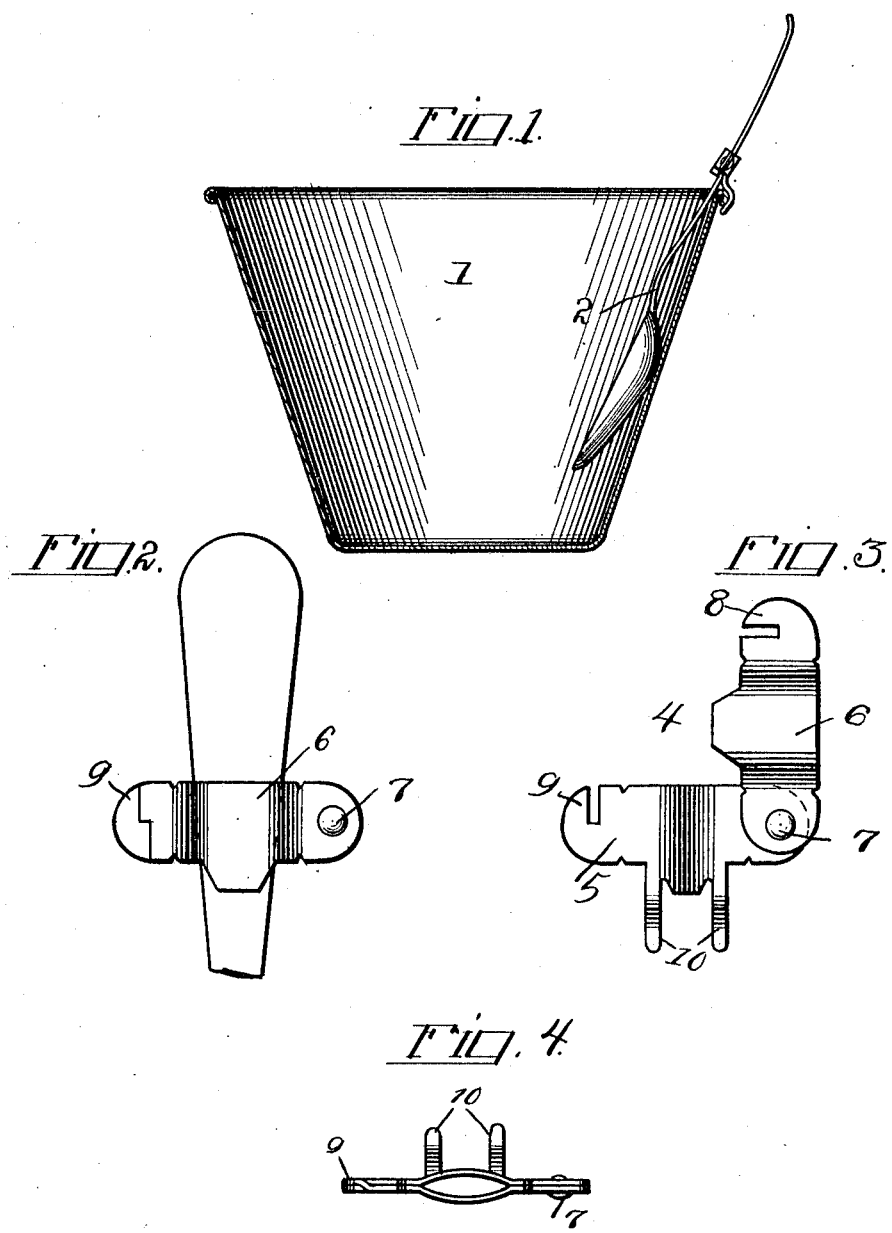

CHARLES A. CARMIENCKE, OF OLINGHOUSE, NEVADA.

SPOON ATTACHMENT.

1,020,263.  Specification of Letters Patent.  Patented Mar. 12, 1912.

Application filed September 24, 1909. Serial No. 519,355.

*To all whom it may concern:*

Be it known that I, CHARLES A. CARMIENCKE, a citizen of the United States, residing at Olinghouse, in the county of Washoe and State of Nevada, have invented new and useful Improvements in Spoon Attachments, of which the following is a specification.

This invention relates to an attachment on spoon handles, and the object of the invention is to provide a device of this character which is adapted to support a spoon upon a vessel so that the handle of the same may be readily grasped when it is desired to remove the spoon.

With the above, and other objects in view which will appear as the description progresses, the invention comprises a pair of resilient metallic plates having one of their ends hingedly connected together and their opposite ends provided with suitable hooks adapted to lock the members when swung into alinement with each other, one of the said plates being provided with offset fingers adapted to serve as a retaining means for the spoon, to which the device is attached upon the frame of a vessel.

In the accompanying drawings there has been illustrated a simple and preferred embodiment of the improvement, and in which:—

Figure 1 is a side elevation of the improvement in applied position upon a spoon and sustaining the same upon the vessel, the vessel being shown in section. Fig. 2 is a front elevation of the device in its locked position. Fig. 3 is a similar view showing one of the members swung open upon the opposite member. Fig. 4 is a top plan view of the device as illustrated in Fig. 2.

In the accompanying drawings the numeral 1 designates a vessel of any desired or particular formation being provided at its open mouth with the usual bead.

The numeral 2 designates an ordinary spoon having the integrally formed handle which gradually increases in width from its point of connection with the bowl of the spoon to the end of the handle.

The numeral 4 designates the improved attachment. This attachment 4 comprises a pair of members 5 and 6, each preferably constructed of suitable resilient material and each also comprising substantially rectangular members. Both of the members 5 and 6 have their central portions bulging outwardly so as to readily adapt the said members to the thickness of the spoon handle and the said members 5 and 6 have one of their ends pivotally connected together as designated by the numeral 7. The opposite ends of the said members 5 and 6 are each provided with oppositely arranged slots so as to provide the lip members 8 and 9. When the members 5 and 6 are swung together into their closed position, the lips 8 and 9 passing through the slots of their respective members are brought into contact with the opposite faces of the said lips and the members thereby effectively and securely engage with each other. One of the members, 5, is centrally provided with a pair of offset downwardly projecting fingers 10, and these fingers are adapted to engage the lip of the vessel 1 as clearly illustrated in Fig. 1 of the drawings.

It will be noted by reference to Figs. 2 and 3 of the drawings that each of the members 5 and 6 have their central bulging portions provided with downwardly extending lips. These centrally positioned lips provide additional contacting areas so as to effectively retain the device upon the handle of the spoon. It will be further noted that the said members 5 and 6 adjacent their bulging portions have their upper and lower edges provided with V-shaped slits, the object of the said slits being to provide for an additional resiliency between the bulging portions of the members without interfering with their flattened extremities.

Having thus described the invention, what I claim as new is:—

A spoon holder comprising a pair of pivotal members formed of sheet metal and pivotally connected to each other, each of said members being formed with a curved spoon handle engaging portion, one of said members being formed with depending offset rim engaging fingers and the other member being formed with a lip adapted to lie in a position between said fingers, the free ends of said members being formed with oppositely disposed slots and adapted to interlock with each other to clamp a spoon handle.

In testimony whereof I affix my signature in presence of two witnesses.

CHARLES A. CARMIENCKE.

Witnesses:
F. R. WILLIAMS,
A. L. MACDOUGALL.